US005732386A

United States Patent [19]

Park et al.

[11] Patent Number: 5,732,386

[45] Date of Patent: Mar. 24, 1998

[54] DIGITAL AUDIO ENCODER WITH WINDOW SIZE DEPENDING ON VOICE MULTIPLEX DATA PRESENCE

[75] Inventors: Seong-Wan Park; Jung-Sik Yoon, both of Kyonggi-Do, Rep. of Korea

[73] Assignee: Hyundai Electronics Industries Co., Ltd., Kyonggi-Do, Rep. of Korea

[21] Appl. No.: 487,275

[22] Filed: Jun. 7, 1995

[30] Foreign Application Priority Data

Apr. 1, 1995 [KR] Rep. of Korea ........................ 95-7648

[51] Int. Cl.[6] ................................ G01L 3/02; H04H 5/00

[52] U.S. Cl. ................................................ 704/203; 381/2

[58] Field of Search ................................ 395/2.12, 2.14, 395/2.38, 2.39; 370/77, 79, 82, 84, 276, 480, 493, 498; 381/2, 395, 381

[56] References Cited

U.S. PATENT DOCUMENTS

| | | | |
|---|---|---|---|
| 3,895,555 | 7/1975 | Peterson et al. . | |
| 4,567,586 | 1/1986 | Koeck | 359/138 |
| 4,631,720 | 12/1986 | Koech | 370/535 |
| 5,038,402 | 8/1991 | Robbins | 455/6.3 |
| 5,195,087 | 3/1993 | Bennett et al. . | |
| 5,297,236 | 3/1994 | Antill et al. . | |
| 5,488,610 | 1/1996 | Morley | 370/471 |
| 5,583,962 | 12/1996 | Davis et al. | 395/2.38 |
| 5,586,193 | 12/1996 | Atsushi et al. | 381/106 |

OTHER PUBLICATIONS

H. Jonathan Chao, Cesar A. Johnston, and Lanny S. Smoot, "A Packet Video/Audio System Using the Asynchronous Transfer Mode Technique", IEEE Transactions on Consumer Electronics, vol. 35, No. 2, pp. 97–105, May 1989.

Robert J. McAulay and Thomas F. Quatieri, "Low-Rate Speech Coding Based on the Sinusoidal Model", chapter 6 in Advances In Speech Signal Processing, ed. by Sadaoki Furui and M. Mohan Sondhi, Marcel Dekker, Inc., pp. 165–208, 1991.

*Primary Examiner*—Allen R. MacDonald
*Assistant Examiner*—Tālivaldis Ivars Smits
*Attorney, Agent, or Firm*—Bryan Cave LLP

[57] ABSTRACT

A digital audio encoder that enables the digital signal processing of a stereo audio signal and multiplexed voice data by extending a two-channel digital audio system of comparatively simple construction. Stereo audio data and multiplexed voice data are sampled and scaled for adjusting the range of the signals. Thereafter, a window is applied to the data. With the window, adjacent blocks are overlapped in order to eliminate noise between the blocks. MDCT and MDST functions are performed using the same size window for extracting and normalizing MDCT and MDST coefficients which respectively indicate an exponent and a mantissa. The mantissa consists of fixed bit data and variable bit data. In order to determine the fixed bit data, fixed bit data are allocated on a sub-band basis. In order to determine the variable bit data, each of the remaining bits are allocated on a sub-band basis from the lowest frequency band. Thereafter, quantization is performed. If multiplexed voice data is not present, 512 pieces of data are processed in each frame. If multiplexed voice data is present, 1024 pieces of data are processed in each frame.

5 Claims, 2 Drawing Sheets

DIGITAL AUDIO ENCODER WITH WINDOW SIZE DEPENDING ON VOICE MULTIPLEX DATA PRESENCE

BACKGROUND OF THE INVENTION

1. Field of the Invention

The present invention relates to a digital audio encoder in which the digital signal processing of audio and multiplexed voice data is accomplished. The audio encoder of the invention may be utilized in a broadcast system in which multiplexed voice data are needed at a terminal used for the transmission or reception of the digital audio data.

2. Description of the Related Art

A conventional digital audio encoder encodes two-channel audio data and utilizes a relatively simple algorithm to maintain sound quality when transmitting and receiving data. Such a two-channel digital audio system can process stereo audio data, but cannot process multiplexed voice data. While the conventional two-channel digital audio system can be adapted so as to be a multi-channel, i.e., operate on more than two channels, such a multi-channel digital audio encoder is complicated and very expensive.

SUMMARY OF THE INVENTION

The present invention provides a digital audio encoder which encodes stereo audio data and multiplexed audio data by utilizing a two-channel digital audio system of comparatively simple construction. In the digital audio encoder of the invention, stereo audio data and multiplexed audio data are sampled and scaled for adjusting the range of each signal. Thereafter, a window is applied to the scaled data and adjacent blocks of data are overlapped so as to eliminate noise between the blocks. MDCT (modified discrete cosine transform) and MDST (modified discrete sine transform) coefficients, which respectively indicate an exponent and a mantissa, are extracted from the data. The mantissa consists of fixed bit and variable bit data. The size of the MDCT/MDST is preferably the same size as the window discussed above. Thereafter, quantization is performed.

The data are formatted in different formats depending upon the presence of multiplexed voice data. If multiplexed voice data are not present, each frame includes 512 items of data. If multiplexed voice data are present, 1024 items of data are processed in each frame.

There is little difference between the digital audio encoder of the present invention and a conventional two-channel encoder system. Consequently, the digital audio encoder of the present invention has a relatively simple construction and can maintain high voice quality.

BRIEF DESCRIPTION OF THE DRAWINGS

Other objects and advantages of the invention will become apparent upon reading the following description in conjunction with the drawings, in which.

DETAILED DESCRIPTION OF THE INVENTION

Figure 1:
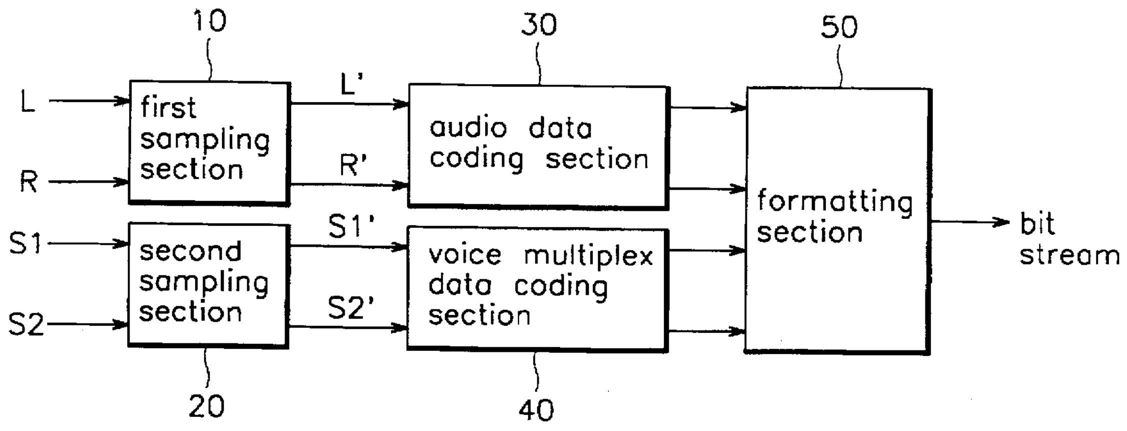
FIG. 1 is a block diagram of the digital audio encoder of the present invention.

Referring to FIG. 1, the digital audio encoder of the present invention comprises a first sampling section 10 for sampling left and right stereo audio signals (L, R) and for generating sampled audio signal data (L', R'). A second sampling section 20 samples multiplexed voice signals (S1, S2), i.e., monophonic voice data for multiplexing, and generates sampled multiplexed voice signals (S1', S2'). An audio data coding section 30 determines the size of a window that is to be applied to the L' and R' data and that is to be utilized for an MDCT/MDST (modified discrete cosine transform/modified discrete sine transform) function, the size of the window being based upon the sampled data (L', R') from the first sampling section 10. A multiplexed voice data coding section 40 determines the size of a window that is to be applied to the S1' and S2' data and that is to be utilized for an MDCT/MDST function, the size of the window being based upon the sampled data (S1', S2') from second sampling section 20. A formatting section 50 formats the output data from the audio data coding section 30 and multiplexed voice data coding section 40 and generates an output bit stream.

Figure 2:
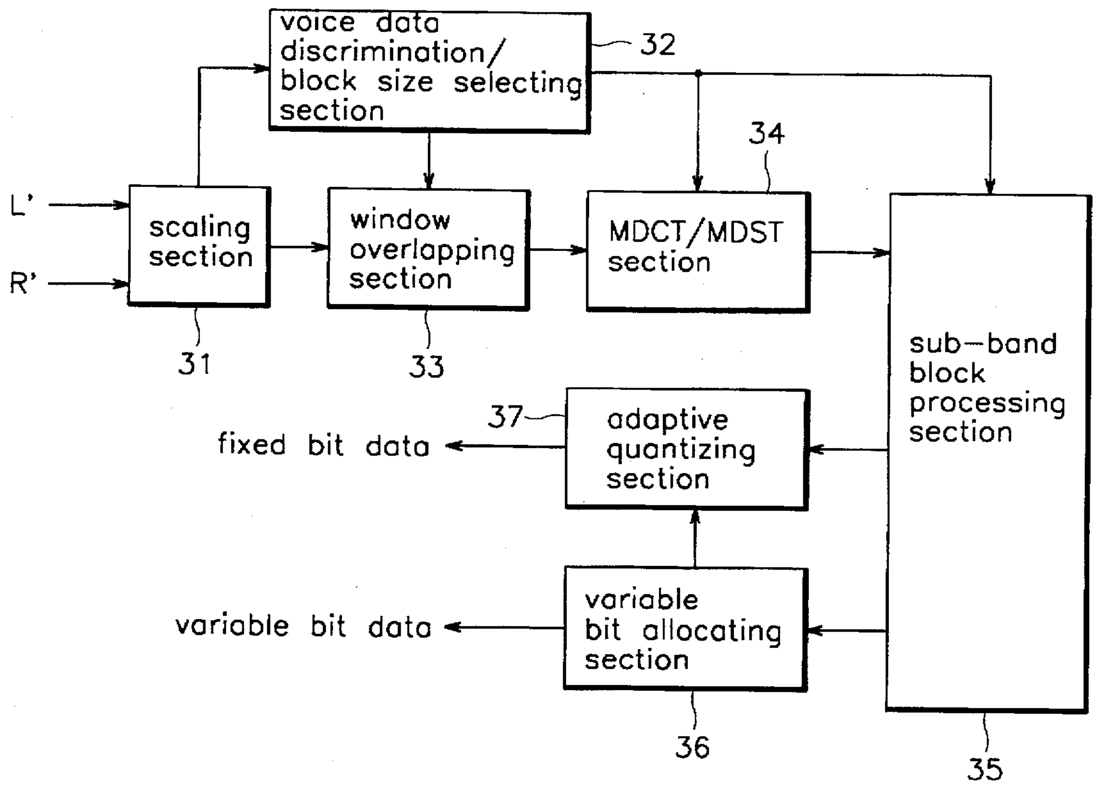
FIG. 2 is a block diagram of the audio data and voice multiplex coding sections of FIG. 1.

Audio data coding section 30 preferably has the same construction as multiplexed voice data coding section 40. As shown in FIG. 2, audio data coding section 30 and voice multiplex data coding section 40 each comprises a scaling section 31 for adjusting the range of the L' and R' data, and the S1' and S2' data respectively. A voice data presence discrimination/block size selecting section 32 determines from the output data of the scaling section 31 whether or not there are any data on the voice channel and determines a block size for the data, as discussed in more detail below.

A window overlapping section 33, determines a window size for the data based upon the output of the voice data presence discrimination/block size selecting section 32. The window overlapping section 33 overlaps adjacent blocks of range-adjusted and scaled data from scaling section 31, and applies an overlap-add window on the overlapped blocks for eliminating noise between the blocks. An MDCT/MDST section 34 extracts MDCT/MDST coefficients by performing an MDCT/MDST operation on the output of the window overlapping section 33. A sub-band block processing section 35 normalizes the MDCT/MDST coefficients and represents each coefficient as an exponent and a mantissa. A variable bit allocation section 36 allocates the variable bit portion of the mantissa. An adaptive quantization section 37 quantizes the variable and fixed bit data of the mantissa, and the exponent, and applies the quantized data to a formatting section 50.

In operation, two stereo audio data signals L and R, and two multiplexed voice data signals S1 and S2 are respectively input to and sampled by first sampling section 10 and second sampling section 20. The stereo audio data signal is generally at 20 KHz or less. Accordingly, a 32, 44.1 or 48 k/bit per second sampling rate is preferably used in sampling section 10. The multiplexed voice data signal is generally at less than 4 KHz. Accordingly, the sampling rate of the second sampling section 20 is preferably half the sampling rate of the first sampling section 10. The sampled data, i.e , L' and R' and S1' and S2', are input to scaling section 31 of audio data coding section 30 and scaling section 31 of multiplexed voice data coding section 40, respectively.

Scaling section 31 scales and adjusts the range of the input data. The scaled data is output to voice data presence discrimination/block size selecting section 32 and window overlapping section 33. Window overlapping section 33 places an overlap-add window on the data input thereto, which eliminates noise between blocks by overlapping adjacent blocks.

The size of the window varies depending upon the block size, which is determined by the voice data presence discrimination/block size selecting section 32. The voice data presence discrimination/block size selecting section 32 determines whether voice data are present from scaling section 31 and uses this information to determine the block size. Generally, when processing stereo audio data only, 512 items of data are contained in one frame. When voice data are present on the voice channel, however, the size of the window is set to 1024, i.e., 2×512. This is because when voice data are present, the voice data are processed simultaneously with the stereo audio data.

The data from window overlapping section 33 is communicated to MDCT/MDST section 34, in which the coefficients of the MDCT and MDST are extracted. The size of the MDCT/MDST is the same size as the window which has been previously determined. The coefficients of the MDCT and MDST are normalized by the sub-band block processing section 35 and the variable bit allocating section 36. The coefficients indicate the exponent and mantissa, respectively.

The exponent is preferably four bits and may be up to fifteen bits. The mantissa consists of fixed bit data and variable bit data. The bit allocation for the fixed bit data is performed on sub-bands of the data. The lower the frequency, the greater number of bits that are allocated. The higher the frequency, the fewer number of bits that are allocated. Variable bit allocating section 35 allocates variable bit data to each sub-band by allocating the remaining bits of the fixed bit data to each sub-band beginning from the lowest frequency sub-band. The variable bit data and the fixed bit data of the mantissa, and the exponent data, are quantized by the adaptive quantizing section 37 and input to formatting section 50.

Similarly, data S1' and S2' sampled by the second sampling section 20 are applied to multiplexed voice data coding section 40. In the multiplexed voice data coding section 40, the MDCT and MDST coefficients are obtained and normalized. The exponent, mantissa fixed bit and variable bit data are obtained, and bit allocation is performed. For determining whether a signal is a voice signal or not, the signal level is measured before performing bit allocation.

For discriminating whether a voice signal is present in each block, a flag bit for each data frame is provided. By setting the flag bit, it may be determined whether voice data are present. When voice data are present and identified, the size of window is determined to be 1024 by voice data presence discrimination/block size selection sections 32. In this situation, the size of the MDCT/MDST is set to be the same size as the window, i.e., 1024 bits.

Figure 3:
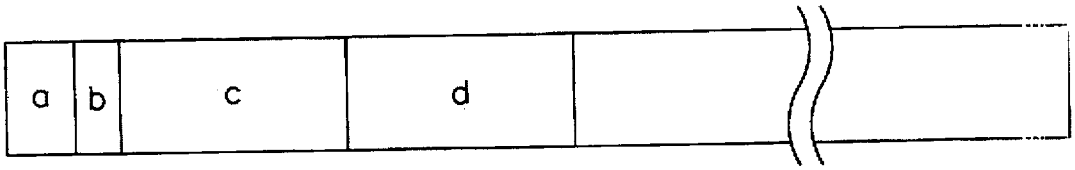
FIG. 3 shows the format of the output data from the digital audio encoder of the present invention when multiplexed voice data are not present on the voice channel.
Figure 4:
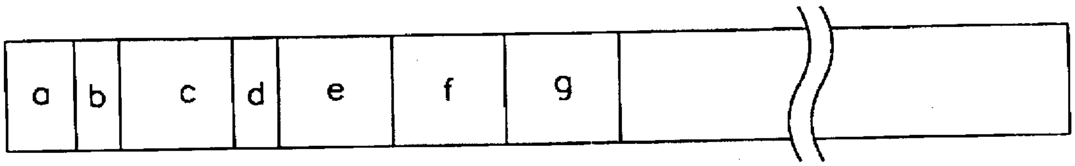
FIG. 4 shows the format of the output data from the digital audio encoder of the present invention when multiplexed voice data are present on the voice channel.

The sampled data (L', R') and (S1', S2'), the variable and fixed bit data of the mantissa, and the exponent of the converted coefficient are output to and formatted by formatting section 50, as shown in FIGS. 3 and 4. FIG. 3 shows the data format when multiplexed voice data are not present. FIG. 4 shows the data format when voice multiplex data are present.

As shown in FIG. 3, when multiplexed voice data are not present, flag (a) is set to indicate the non-presence of multiplexed voice data. The remaining blocks include sub-band exponent data (b), fixed bit data (c) and variable bit data (d). Exponent data (b) is inserted between the fixed bit data (c) and the flag data (a) in order to minimize the effects of errors occurring during transmission.

As shown in FIG. 4, when there are multiplexed voice data present, flag (a) is set to indicate the presence of multiplexed voice data. The remaining blocks include exponent (b) and fixed bit data (c) of audio data coding section 30, exponent (d) and fixed bit data (e) of the multiplexed voice data coding section (40), variable bit data (f) of audio data coding section (30) and variable bit data (g) of the multiplexed voice data coding section (40).

The matter set forth in the foregoing descriptions and accompanying drawings is offered by way of illustration only and not as a limitation. The actual scope of the invention is intended to be defined in the following claims when viewed in their proper perspective based on the prior art.

What is claimed is:

1. A digital audio encoder comprising:

a first sampling section (10) for sampling a two channel stereo audio signal (L, R);

a second sampling section (20) for sampling a two channel voice multiplex signal (S1, S2);

an audio data coding section (30) for determining the size of a window to be applied to the sampled two channel stereo audio signal (L', R') and an MDCT/MDST to be applied to the sampled two channel stereo audio signal (L', R'), the size of the window varying depending upon the presence of voice data;

a voice multiplex data coding section (40) for determining the size of a window to be applied to the sampled two channel voice multiplex signal (S1', S2') and an MDCT/MDST to be applied to the sampled two channel voice multiplex signal (S1', S2') when voice data is present; and a formatting section (50) for formatting output data from the audio data coding section (30) and the voice multiplex data coding section (40) and for generating an output bit stream, the formatting varying depending upon the presence of the voice data.

2. The digital audio encoder according to claim 1 wherein the sampling frequency of the second sampling section (20) is half of the sampling frequency of the first sampling section (10).

3. The digital audio encoder according to claim 1 wherein each of the audio data coding section (30) and the voice multiplex data coding section (40) comprises:

a scaling section (31) for adjusting the range of the sampled data (L', R'), (S1', S2') which is respectively sampled by the first sampling section (10) and the second sampling section (20);

a voice data presence discrimination/block size selecting section (32) for determining, according to the output data of the scaling section (31), whether voice data is present and for determining the block size;

a window overlapping section (33) for determining the size of the window according to the output signal of the voice data presence discrimination/block size selection section (32), for overlapping adjacent blocks of the range-adjusted data from the scaling section (31), and for applying an overlap-add window on the overlapped blocks for eliminating noise between the blocks;

an MDCT/MDST section (34) for extracting MDCT/MDST coefficients by performing an MDCT/MDST operation on the output signal of the window overlapping section (33);

a sub-band block processing section for normalizing the MDCT/MDST coefficients and for representing each coefficient as an exponent and a mantissa;

a variable bit allocation section (36) for allocating a variable bit item in the mantissa which is represented by the sub-band block processing section 35; and an adaptive quantization section (37) for quantizing the variable bit data of the viable bit allocating section 36, and the fixed bit data of the mantissa, and the exponent, and for outputting the quantized data to the formatting section (50).

4. The digital audio encoder according to claim 3 wherein the voice data presence discrimination/block size selection section (32) determines whether voice multiplex data is input thereto, and when the voice multiplex data is present establishes the size of the window and MDCT/MDST as 1024.

5. The digital audio encoder according to claim 3 wherein the formatting section (50), when voice multiplex data is present, formats the output data in the sequence of flag data (a) representing whether or not there is synchronous data and voice multiplex data, the exponent (b) of the audio data coding section (30), the fixed bit data (c) of the audio data coding section (30), the exponent (d) of the voice multiplex data coding section (40), the fixed bit data (e) of the voice multiplex data coding section (40), the variable bit data (f) of the audio data coding section (30), and the variable bit data (g) of the voice multiplex data coding section (40).

* * * * *